United States Patent [19]
Sugiyama

[11] 3,742,354
[45] June 26, 1973

[54] METHOD AND APPARATUS FOR CHANGING MEASURING ITEMS AND MEASURING RANGES

[75] Inventor: Takashi Sugiyama, Tokyo, Japan

[73] Assignee: Yokogawa Electric Works, Ltd., Tokyo, Japan

[22] Filed: Aug. 18, 1971

[21] Appl. No.: 172,740

[30] Foreign Application Priority Data
Aug. 21, 1970 Japan.................................. 45/73338

[52] U.S. Cl. .............................. 324/115, 324/99 D
[51] Int. Cl. ........................................... G01r 15/08
[58] Field of Search ......................... 324/115, 99 D

[56] References Cited
UNITED STATES PATENTS 2,889,518 6/1959 Hudson et al..................... 324/99 D
2,981,107 4/1961 Anderson........................... 324/115
3,237,102 2/1966 Newell............................... 324/115

Primary Examiner—Rudolph V. Rolinec
Assistant Examiner—Ernest F. Karlsen
Attorney—Chittick, Pfund, Birch, Samuels & Gauthier

[57] ABSTRACT

In a method of measuring various input signals over a wide range by combining one of a plurality of measuring items and one of a plurality of measuring ranges, the measuring item and measuring range are changed by manually selecting a measuring item, simultaneously shifting the position of the decimal point to the position of the minimum sensitivity of the selected measuring item, and then successively shifting the position of the decimal point until a desired range is reached.

6 Claims, 2 Drawing Figures

METHOD AND APPARATUS FOR CHANGING MEASURING ITEMS AND MEASURING RANGES

BACKGROUND OF THE INVENTION

The present invention relates to a method and apparatus for changing measuring items and measuring ranges and more particularly to such method and apparatus enabling one to measure over wide ranges various input signals such as voltage, current, resistance, etc, by selectively combining a plurality of measuring items and a plurality of measuring ranges.

Multi-item measuring apparatus have recently been developed wherein various measured signals are converted into voltage signals which are measured by means of digital voltmeters, for example. In such multi-item measuring apparatus combinations of various measuring items and measuring ranges are extremely complicated so that such apparatus require complicated operation. Moreover, it is necessary to provide in duplicate switches for selecting manual circuits and automatic circuits. This also complicates the construction and increases the cost of manufacture.

SUMMARY OF THE INVENTION

Accordingly, it is an object of this invention to provide a new and improved method and apparatus for changing the measuring item and measuring range by adding a simple manually operated apparatus to an existing automatic range changing circuit.

According to one aspect of this invention, in a method of measuring various input signals over a wide range by combining one of a plurality of measuring items and one of a plurality of measuring ranges, there is provided a method of changing the measuring item and the measuring range comprising the steps of manually selecting a measuring item, simultaneously shifting the position of the decimal point to a position of the minimum sensitivity of the selected measuring item, and then successively shifting the position of the decimal point until a desired range is reached.

According to another aspect of this invention, for use in combination with an automatic range selecting circuit comprising a level detector which is constructed to compare an input signal with predetermined upper and lower limits to provide an output signal dependent upon whether the input signal is higher than the upper limit or lower than the lower limit, a reversible counter responsive to the output of the level detector to provide a signal representing a position of the decimal point, and means responsive to the count of the reversible couter and a signal representing a selected measuring item for selecting a measuring range, there is provided apparatus for varying the measuring item and the measuring range comprising a manual setter including a first switch for shifting upwardly the position of the decimal point and a second switch for shifting downwardly the position of the decimal point, and transfer switch means for transferring the connection to the input of the reversible counter between the output from the level detector and the output from the manual setter.

DESCRIPTION OF THE PREFERRED EMBODIMENT

Figure 1:
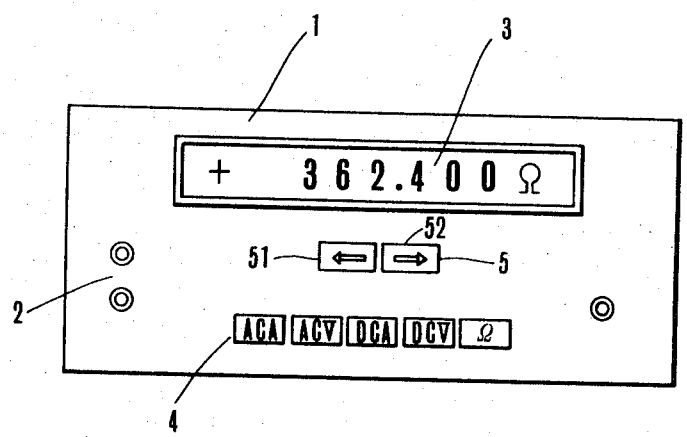
FIG. 1 shows a front elevation of an operating panel of measuring apparatus embodying the invention and FIG. 2 is a block diagram of one example of the novel apparatus for changing the measuring items and the measuring ranges.

The operating panel 1 of the measuring apparatus shown in FIG. 1 comprises input terminals 2 for measured signals, a display window 3 providing digital displays of the measured results, and a group of push buttons 4 for setting or selecting measuring items. In this example, there are provided five push buttons ACA, ACV, DCA, DCV and $\Omega$, respectively corresponding to alternating current, alternating current voltage, direct current, direct current voltage and resistance. There is also provided a range setting or selecting push button means 5 including a push button 51 for upwardly shifting the position of the decimal point and a push button 52 for downwardly shifting the position of the decimal point.

The measuring apparatus equipped with the operating panel described above is operated as follows :

To measure a voltage, for example the voltage to be measured is applied to input terminals 2 and push button ACV corresponding to the item of AC voltage is depressed. So long as the decimal point shifting push button 5 is not operated a measuring range having a minimum sensitivity is selected. As a consequence a value of the voltage measured by the measuring range with the minimum sensitivity is displayed on the display window 3. When the result of measurement is difficult to read with this lowest range the position of the decimal point is shifted by successively operating push button 51 for upwardly shifting the decimal point by successive positions to select a position of the decimal point at which it is easy to read the measured value. If the up push button 51 were operated too many times, it would become impossible to completely display the result of measurement on the display window thus causing over range display. In such a case, down push button 52 is operated to shift downwardly the position of the decimal point to select another position of the decimal point enabling easy reading of the measured value. In this manner, the selection of the measuring range can be made by selecting a point of the decimal point at which it is possible to read the measured value most easily by selectively operating two decimal point shifting push buttons 51 and 52 while observing the display window 3.

Figure 2:
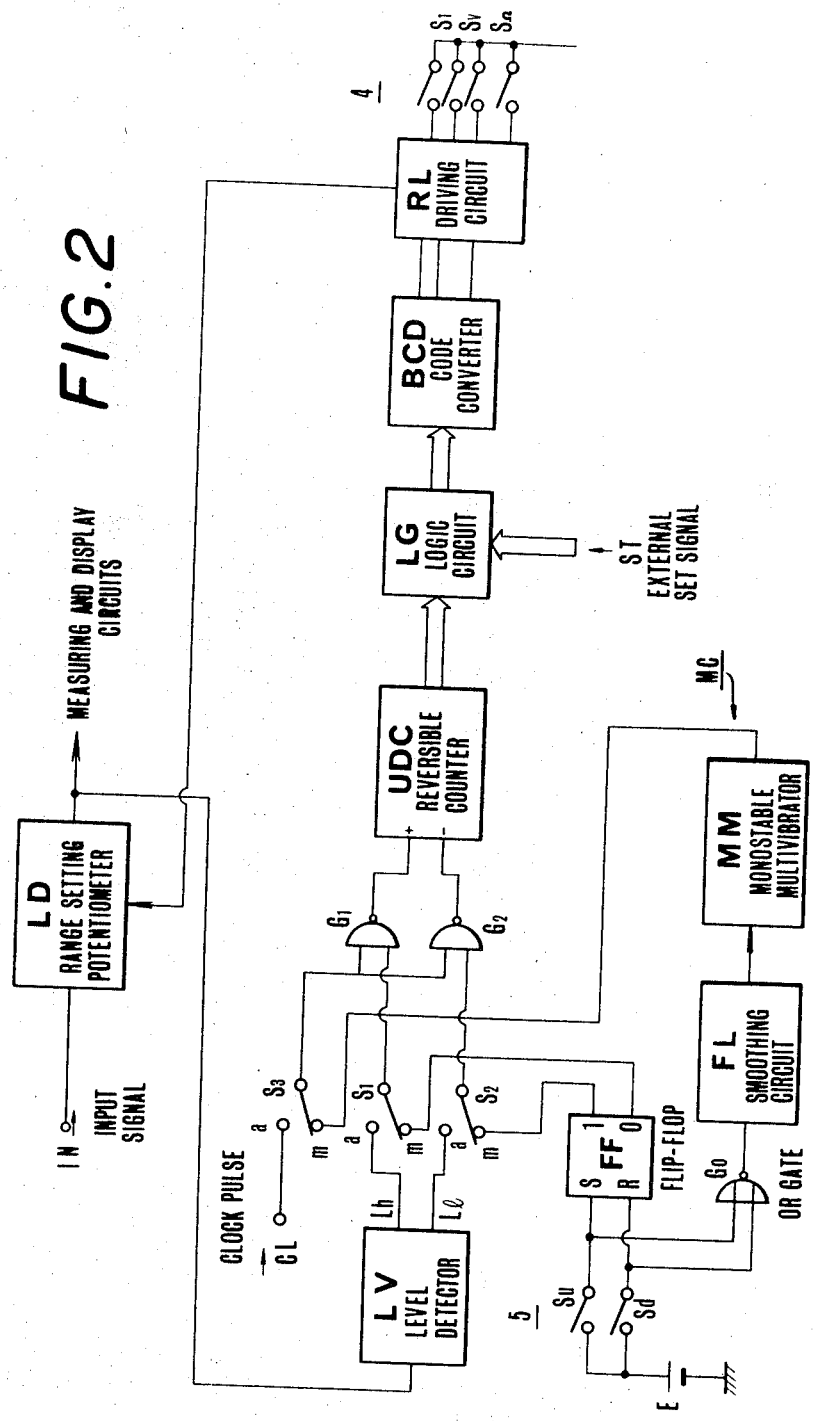

FIG. 2 is a block diagram of one example of the apparatus for changing the measuring items and measuring ranges embodying the invention. Push buttons 4 shown in FIG. 1 for selecting measuring items are shown in FIG. 2 as comprising a plurality of switches $S_I$, $S_V$ and S corresponding to current, voltage and resistance, respectively. Decimal point shifting push button 5 is shown as comprising a up switch $S_u$ and a down switch $S_d$ which are connected to the set terminal S and the reset terminal R, respectively, of a flip-flop circuit FF. The opposite sides of these contacts are connected to a dc source E. The set and reset terminals S and R of the flip-flop circuits are connected to a monostable multivibrator MM via an OR gate circuit $G_O$ and a smoothing circuit FL. The input signal applied to input terminal IN is supplied to a level detector LV through a conventional range setting potentiometer LD. The level detector LV operates to detect input signals exceeding a upper limit and those less than a lower limit so as to produce output signals to output terminals Lh and L*l* in response to signals above and below the upper and lower limits respectively. Three transfer switches $S_1$, $S_2$ and $S_3$ are connected as shown between an input terminal CL which receives clock pulses, output terminals Lh and L*l* of level detector LV, set signal output terminal 1 and reset signal output terminal O of flip-flop circuit FF, the output terminal of monostable multivibrator MM and two AND gate circuits $G_1$ and $G_2$. The outputs of these AND gate circuits are applied to an addition terminal + and a subtraction terminal − of a reversible counter UDC which counts the number of pulse signals applied thereto to produce a decimal point signal in the form of a binary code. The value of notation of reversible counter UDC indicates the location of the decimal point. A logic circuit LG is provided to switch between the output signal from the reversible counter UDC and an external set signal applied to an input terminal ST. The binary code signal from logic circuit LG is converted by code converter BCD into decimal coded signal which is fed over a plurality of output leads to a driving circuit RL which also receives signals from switches $S_1$, $S_V$ and S and provides a signal which is used to set range setting potentiometer LD so that the measuring and display circuits responsive to the output of the potentiometer have the particular range for the item being measured and the appropriate decimal point position. The above described arrangement of decimal point shifting switch 5, flip-flop circuit FF, OR gate circuit $G_O$, smoothing circuit FL and monostable multivibrator MM constitute a manual range changing circuit MC of the invention whereas the remaining component elements a conventional automatic range changing circuit.

To perform a measurement with the automatic range changing circuit, the input signal is applied to terminals 2 and the appropriate push button 4 depressed (FIG. 1). Also the movable contacts of transfer switches $S_1$, $S_2$ and $S_3$ are thrown to their contacts *a*, thus connecting the upper and lower limit output terminals Lh and L*l* of level detector LV to input terminals respectively of AND gate circuits $G_1$ and $G_2$, and to connect clock pulse input terminal CL to the other input terminals of AND gate circuits $G_1$ and $G_2$. Consequently, the input signal impressed upon input terminal IN after passing through the range setting potentiometer LD is applied to the level detector LV and compared with the upper set value h and the lower set valve *l* by the level detector LV. Where the value of the input signal assumes a value intermediate the upper and lower set values h and *l* the level detector LV does not produce any output because the measuring range now being used is appropriate for the measurement. Thus, it is possible to at once commence the measuring operation without the necessity of changing the measuring range. In this case, the driving circuit RL provides the range setting potentiometer with a signal dependent on which switch $S_1$, $S_v$, S (denoting the item measured) is operated and the initial reset value of the counter UDC. Thus, the minimum sensitivity range for the item being measured is selected and the lowest position for the decimal point chosen.

Where the value of the input signal is smaller than the lower set value l, level detector LV produces a signal at its lower limit output terminal Ll to enable AND gate circuit $G_2$ whereby each clockpulse coming from terminal CL is applied to the subtraction terminal − of reversible counter UDC to decrease its by one step. This count is applied to the code converter BCD and is converted into a decimal code designating the position of the decimal point. This decimal code is applied to driving circuit RL so as to produce a signal which functions to change the ratio of voltage division of the potentiometer LD for changing the range to one of more sensitivity and for shifting the position of the decimal point in accordance with the order of magnitude of the count of the reversible counter UDC. When the voltage division ratio is sufficient to bring the level of the input signal between the upper and lower set values h and *l* the output of the level detector LV appearing at its lower limit output terminal L disappears. Whereupon the range changing operation is terminated and the measuring operation is commenced. In the same manner, where the level of the input signal is higher than the upper set value h of the level detector LV a signal is provided at its upper limit output terminal Lh to enable AND gate circuit $G_1$. Consequently, the clock pulse is applied to the addition terminal + of the reversible counter UDC to increase its count. Thereafter, by the operation similar to that described above the voltage division ratio of the range setting potentiometer LD is changed until a proper level of the input signal is attained.

The purpose of the logic circuit LG is to substitute a code signal impressed upon terminal ST which represents a set value of different range and measuring item for the counts of the reversible counter UDC which has been impressed upon code converter BCD and to operate the switches for setting measuring items.

The operation for manually changing the measuring range is as follows. To this end, the transfer switches $S_1$, $S_2$ and $S_3$ are thrown to contacts *m*, respectively. Then level detector LV and clock pulse input terminal CL are disconnected from reversible counter UDC, and flip-flop circuit FF and multivibrator MM of the manual range changing circuit MC are connected to reversible counter UDC instead of them. To shift upwardly the position of the decimal point, up switch Su is closed to set flip-flop circuit FF. Then, this circuit applies a set output signal to AND gate circuit $G_2$ thus enabling the same. At the same time, up switch Su applies a signal to monostable multivibrator MM via OR gate circuit $G_O$ and smoothing circuit FL. Thus, monostable multivibrator MM produces a pulse signal which is applied to the subtraction terminal of the reversible counter through enabled AND gate circuit $G_2$ to decrease the count of the reversible counter. In this manner, the position of the decimal point is shifted upwardly by one order to magnitude and the voltage division ratio of the potentiometer LD is changed toward a higher sensitivity range by one step. To shift the decimal point upwardly by an additional one order, up switch Su is closed again. On the other hand to shift the position of the decimal point downwardly, down switch Sd is closed to reset flip-flop circuit FF. The reset output from the flip-flop circuit enables AND gate circuit $G_1$. At the same time, the output of switch Sd is applied to monostable multivibrator MM through OR gate circuit $G_O$ and smoothing circuit FL. The output pulse from the monostable multivibrator MM is applied to addition terminal + of reversible UDC through enabled AND gate circuit $G_1$ to increase its count by one. Thereafter, the measuring range is changed in the same manner as in the automatic range changing operation described above for shifting downwardly the position of the decimal point by one order of magnitude. By the sequential operations of down switch $Sd$, it is possible to shift downwardly the postion of the decimal point by any desired orders of magnitude. In this manner, to manually select a desired measuring range, transfer switches $S_1$, $S_2$ and $S_3$ are thrown to contacts $m$ and then up or down switches Su, Sd is closed for the desired number of times to shift the position of the decimal point.

As above described, according to this invention it is possible to provide a manual range selection circuit by adding a simple circuit comprising a flip-flop circuit and a monostable multivibrator to an automatic range changing circuit. This arrangement avoids use of an additional circuit for manually setting the measuring range as in the conventional apparatus thus avoiding duplicate provision of the manual range setting mechanism. For this reason, it is possible to simplify the construction and operation of the apparatus. Thus, the invention provides a novel method and apparatus for measuring various input signals over wide ranges by the suitable combination of a plurality of measuring items and a plurality of measuring ranges.

Although the invention has been shown and described in terms of a preferred embodiment thereof, it should be understood that many changes and modifications will be obvious to one skilled in the art without departing from the true spirit and scope of the invention as defined in the appended claims.

What is claimed is:

1. For use in combination with an automatic range selecting circuit comprising a level detector which is constructed to compare an input signal with predetermined upper and lower limits to provide an output signal dependent upon whether the input signal is higher than said upper limit or lower than said lower limit, a reversible counter responsive to the output of said level detector to provide a signal representing a position of a decimal point, and means responsive to the count of said reversible counter and a signal representing a selected measuring item for selecting a measuring range, apparatus for varying the measuring range comprising a manual setter including a first switch for shifting upwardly the position of the decimal point and a second switch for shifting downwardly the position of the decimal point, and transfer switch means for transferring the connection to the input of said reversible counter between the output from said level detector and the output from said manual setter.

2. The apparatus according to claim 1 wherein a range setting potentiometer is connected between an input terminal for said input signal and said level detector and said range setting potentiometer is adjusted by said means responsive to the counts of said reversible counter and a signal representing a selected measuring item.

3. The apparatus according to claim 1 which further comprises an input terminal for receiving a clock pulse, a first AND gate circuit connected to the addition input terminal of said reversible counter and a second AND gate circuit connected to the subtraction input terminal of said reversible counter, and wherein said transfer switching means is adapted to connect to said first and second AND gate circuits either said clock pulse input terminal together with the output from said level detector or the output from said manual setter.

4. The apparatus according to claim 1 which further includes a logic circuit and a code converter which are connected in series between the output of said reversible counter and said means responsive to the count of said reversible counter and a signal representing a selected measuring item, said logic circuit, when operable transferring its input from said count of said reversible counter to an external code signal representing the set values regarding the selected measuring item and measuring range and said code converter acting to convert the output from said logic circuit into a decimal code representing a given position of the decimal point.

5. The apparatus according to claim 3 wherein said manual setter further includes a flip-flop circuit with its set and reset input terminals connected to said first and second switches respectively and its set and reset output terminals connected to the subtraction and addition input terminals of said reversible counter through said transfer switching means and said second and first AND gate circuits respectively, a monostable multivibrator, an OR gate circuit and a smoothing circuit, the output of said monostable multivibrator being connected to the inputs of said first and second gate circuits through said transfer switching means, said OR gate circuit receiving its inputs from both said first and second switches and said smoothing circuit being connected between said the output of said OR gate circuit and the input of said monostable multivibrator.

6. The apparatus according to claim 1 wherein said reversible counter starts from an initial reset count each time a new item is to be measured.

* * * * *

UNITED STATES PATENT OFFICE
CERTIFICATE OF CORRECTION

Patent No. 3,742,354          Dated  June 26, 1973

Inventor(s)  Takashi Sugiyama

It is certified that error appears in the above-identified patent and that said Letters Patent are hereby corrected as shown below:

Column 2, line 55, "S" should be -- $S_\Omega$ --.

Column 3, line 24, "S" should be -- $S_\Omega$ --.

Column 3, line 59, "S" should be -- $S_\Omega$ --.

Column 4, line 2, after "its" insert -- count --.

Column 4, line 65, before "UDC" insert -- counter --.

Signed and sealed this 22nd day of January 1974.

(SEAL)
Attest:

EDWARD M. FLETCHER, JR.              RENE D. TEGTMEYER
Attesting Officer                    Acting Commissioner of Patents